R. W. McClelland.
Revolving Rake.

No. 101,752. Patented April 12, 1870.

Witnesses.
F. W. Howard
Daniel J. Marr

Inventor.
R. W. McClelland,
by Prindle & Dyer
Ass. Att'ys

United States Patent Office.

ROBERT W. McCLELLAND, OF SPRINGFIELD, ILLINOIS.

Letters Patent No. 101,752, dated April 12, 1870; antedated April 4, 1870.

HORSE HAY-RAKE.

The Schedule referred to in these Letters Patent and making part of the same

*To all whom it may concern:*

Be it known that I, ROBERT W. McCLELLAND, of Springfield, in the county of Sangamon and in the State of Illinois, have invented an Improved Horse Hay-Rake; and do hereby declare that the following is a full, clear, and exact description thereof, reference being had to the accompanying drawing making a part of this specification, in which—

Letters of like name and kind refer to like parts in each of the figures.

Figure 2:
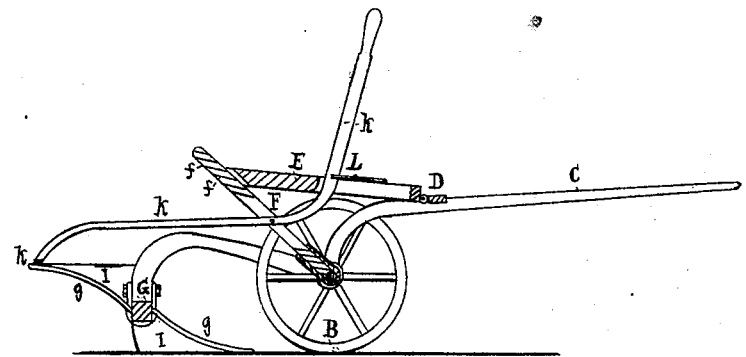
Figure 2 is a vertical cross-section of the same on the line $x\, x$, of fig. 1.
Figure 1:
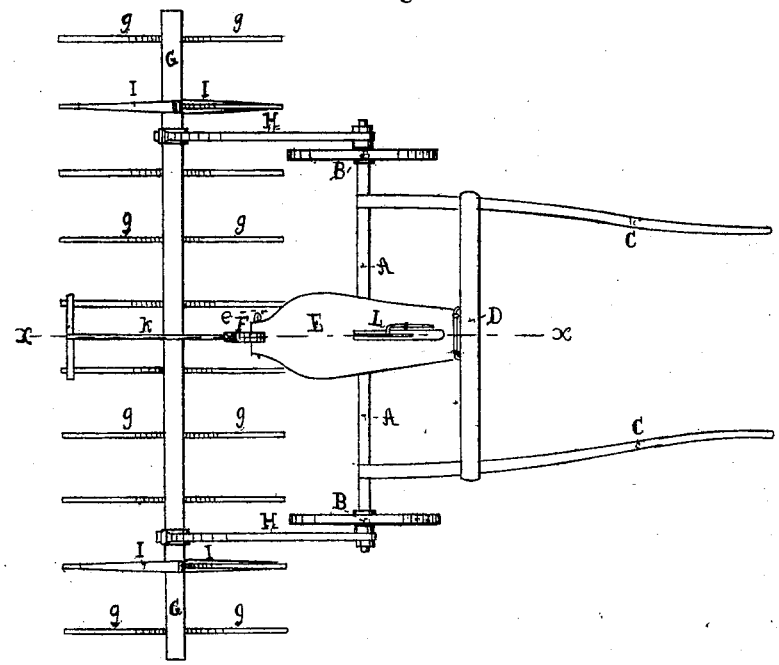
Figure 1 is a plan view of my improved device.

My invention relates to a class of agricultural implements termed horse hay-rakes, and It consists in the general construction and arrangement of the various parts of the device, by means of which a simple, cheap, and efficient rake is produced, as is hereinafter fully described.

In the annexed drawing—

A represents the axle, supported at either end by means of two ground wheels, B and B, suitably journaled thereon.

The shafts C and C are permanently attached to the axle A, at their rear ends, and are tied together at a suitable distance therefrom by means of a cross-bar, D.

E represents a seat hinged at its front end to the cross-bar D, and supported at its rear end by a standard, F, which is journaled at its lower end upon the shaft A, and connected with said seat by means of a pin, e, passing through the slotted end thereof, and through one of a series of holes, f, in said standard, by which means the rear end of said seat can be raised or lowered, as may be desired.

G represents the rake-head, having secured therein two rows of teeth, g and g, and being connected with the axle by means of two arms, H and H, pivoted at their forward ends upon said axle outside of the wheels and journaled at their rear ends upon said rake-head, said arms being curved upward and forward from said rake-head, so as to entirely clear the hay gathered upon or by the teeth.

This method of attachment renders the rake vertically independent of the axle, and enables it to rise or fall at either end, so as to conform to the undulations of the ground.

Secured immediately beneath a tooth in each row, just outside of each arm H, is a guide, I, the upper edge of which conforms to the forward curve of the teeth, while its lower edge is straight and adjusted to a suitable angle with said teeth, so that when resting upon the ground, the rake-head is elevated to and retained in the desired position.

The device is now capable of use, but it will be seen that as soon as a sufficient quantity of hay is collected upon the teeth, its weight will cause the head to trip unless prevented.

In order that this object may be accomplished, and said rake-head prevented from tipping, except when desired, a lever, K, is pivoted near its center, lengthwise, within a slot in the standard F, and extending rearward, is provided with a cross-bar, $k$, secured horizontally and at a right angle thereto, which cross-bar rests upon the rear ends of two teeth in the rear or upper row.

From the standard F said lever K curves forward and upward through a slot in the seat E and terminates in a handle within convenient reach of the operator's hand.

A catch, L, is secured to said seat and engaging with the front edge of said lever, holds the same in place and prevents its rear end from rising, so as to liberate the rake-head.

As thus constructed and arranged, the device is complete, and its operation is as follows:

The lever K being locked in place, and one row of teeth resting upon the ground, the rake is driven forward until a sufficient quantity of hay is gathered thereon, when, by releasing said lever from engagement with the catch L, and allowing its rear end to raise the rake-head is permitted to revolve, and deposit its load, after which the lever should be returned to and locked in place.

It is believed that this device possesses, in an eminent degree, the qualities of simplicity, durability, cheapness, and ease of operation, and that its introduction into general use will prove a public benefit.

Having thus fully set forth the nature and merits of my improvement,

What I claim as new, and desire to secure by Letters Patent, is—

The within-described device, consisting of the axle A, the wheels B, the shafts C, provided with the cross-bar D, the seat E, adjustable upon the standard F, the rake-head and teeth G and $g$, the arms H, the guide-blocks I, and lever K, pivoted to the standard F, all constructed and arranged substantially as and for the purpose specified.

In testimony that I claim the foregoing, I have hereunto set my hand this 4th day of August, 1869.

ROBERT W. McCLELLAND.

Witnesses:
 GEO. O. MARCY,
 EUGENE VAN LOAN.